(12) United States Patent
VanBlon et al.

(10) Patent No.: US 10,880,378 B2
(45) Date of Patent: Dec. 29, 2020

(54) CONTEXTUAL CONVERSATION MODE FOR DIGITAL ASSISTANT

(71) Applicant: Lenovo (Singapore) Pte. Ltd., Singapore (SG)

(72) Inventors: Russell Speight VanBlon, Raleigh, NC (US); Arnold S. Weksler, Raleigh, NC (US); John Carl Mese, Cary, NC (US); Nathan J. Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 210 days.

(21) Appl. No.: 15/355,758

(22) Filed: Nov. 18, 2016

(65) Prior Publication Data

US 2018/0146048 A1 May 24, 2018

(51) Int. Cl.
*H04L 29/08* (2006.01)
*G06F 9/451* (2018.01)
*G10L 15/22* (2006.01)
*H04W 84/12* (2009.01)
*H04W 88/02* (2009.01)

(52) U.S. Cl.
CPC ............ *H04L 67/14* (2013.01); *G06F 9/453* (2018.02); *G10L 15/22* (2013.01); *H04L 67/02* (2013.01); *H04L 67/26* (2013.01); *G10L 2015/223* (2013.01); *H04W 84/12* (2013.01); *H04W 88/02* (2013.01)

(58) Field of Classification Search
CPC .... G06F 15/16; G06F 17/30873; G06F 3/167; H04L 65/1069; H04L 29/06027; H04L 65/4076
USPC .......................................... 709/201, 203, 227
See application file for complete search history.

(56) References Cited

U.S. PATENT DOCUMENTS

| | | | | |
|---|---|---|---|---|
| 10,003,840 | B2 * | 6/2018 | Richman | H04N 21/2358 |
| 10,142,276 | B2 * | 11/2018 | Rapaport | H04L 51/32 |
| 2012/0076732 | A1 * | 3/2012 | Feng | C07D 215/48 |
| | | | | 424/9.2 |
| 2013/0304479 | A1 | 11/2013 | Teller et al. | |
| 2014/0032483 | A1 * | 1/2014 | Tulley | G06F 16/447 |
| | | | | 707/607 |
| 2014/0032627 | A1 * | 1/2014 | Lorenz | H04L 65/4076 |
| | | | | 709/201 |
| 2014/0032634 | A1 * | 1/2014 | Pimmel | H04L 65/1069 |
| | | | | 709/203 |
| 2014/0122086 | A1 | 5/2014 | Kapur et al. | |
| 2015/0289023 | A1 | 10/2015 | Richman et al. | |

(Continued)

FOREIGN PATENT DOCUMENTS

| CN | 104335560 A | 2/2015 |
|---|---|---|
| CN | 104505093 A | 4/2015 |

(Continued)

*Primary Examiner* — Tesfay Yohannes
(74) *Attorney, Agent, or Firm* — Ference & Associates LLC

(57) ABSTRACT

One embodiment provides a method, including: receiving, at an information handling device, an indication to initiate a contextual session associated with a context; receiving, at the device, at least one context input during a duration of the contextual session; and responsive to receiving the at least one context input, extending the duration of the contextual session, wherein the extended duration does not require receipt of subsequent indications. Other aspects are described and claimed.

16 Claims, 3 Drawing Sheets

(56) References Cited

U.S. PATENT DOCUMENTS

| | | | |
|---|---|---|---|
| 2016/0173578 A1* | 6/2016 | Sharma | G06F 3/167 |
| | | | 709/203 |
| 2016/0232538 A1* | 8/2016 | Papakostas | G06F 16/48 |
| 2017/0093781 A1* | 3/2017 | Sharma | H04L 51/36 |
| 2018/0103150 A1* | 4/2018 | Chavez | H04L 12/1496 |
| 2018/0122372 A1* | 5/2018 | Wanderlust | G06F 3/167 |
| 2018/0131810 A1* | 5/2018 | Yokel | G06N 7/005 |

FOREIGN PATENT DOCUMENTS

| | | |
|---|---|---|
| CN | 102447786 A | 5/2015 |
| CN | 104813311 A | 7/2015 |
| CN | 105320726 A | 2/2016 |
| EP | 2784774 A1 | 10/2014 |
| EP | 2950307 A1 | 12/2015 |

\* cited by examiner

US 10,880,378 B2

CONTEXTUAL CONVERSATION MODE FOR DIGITAL ASSISTANT

BACKGROUND

Information handling devices ("devices"), for example, smart phones, tablet devices, laptop computers, smart speakers, and the like may employ voice-activated digital assistants ("digital assistants") that are capable of processing audible commands. Responsive to recognizing an audible command provided by a user, the digital assistant may execute a corresponding task.

BRIEF SUMMARY

In summary, one aspect provides a method, comprising: receiving, at an information handling device, an indication to initiate a contextual session associated with a context; receiving, at the device, at least one context input during a duration of the contextual session; and responsive to receiving the at least one context input, extending the duration of the contextual session, wherein the extended duration does not require receipt of subsequent indications.

Another aspect provides an information handling device, comprising: a processor; a memory device that stores instructions executable by the processor to: receive an indication to initiate a contextual session associated with a context; receive at least one context input during a duration of the contextual session; and responsive to receiving the at least one context input, extend the duration of the contextual session, wherein the extended duration does not require receipt of subsequent indications.

A further aspect provides a product, comprising: a storage device that stores code, the code being executable by a processor and comprising: code that receives an indication to initiate a contextual session associated with a context; code that receives at least one context input during a duration of the contextual session; and responsive to receiving the at least one context input, code that extends the duration of the contextual session, wherein the extended duration does not require receipt of subsequent indications.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
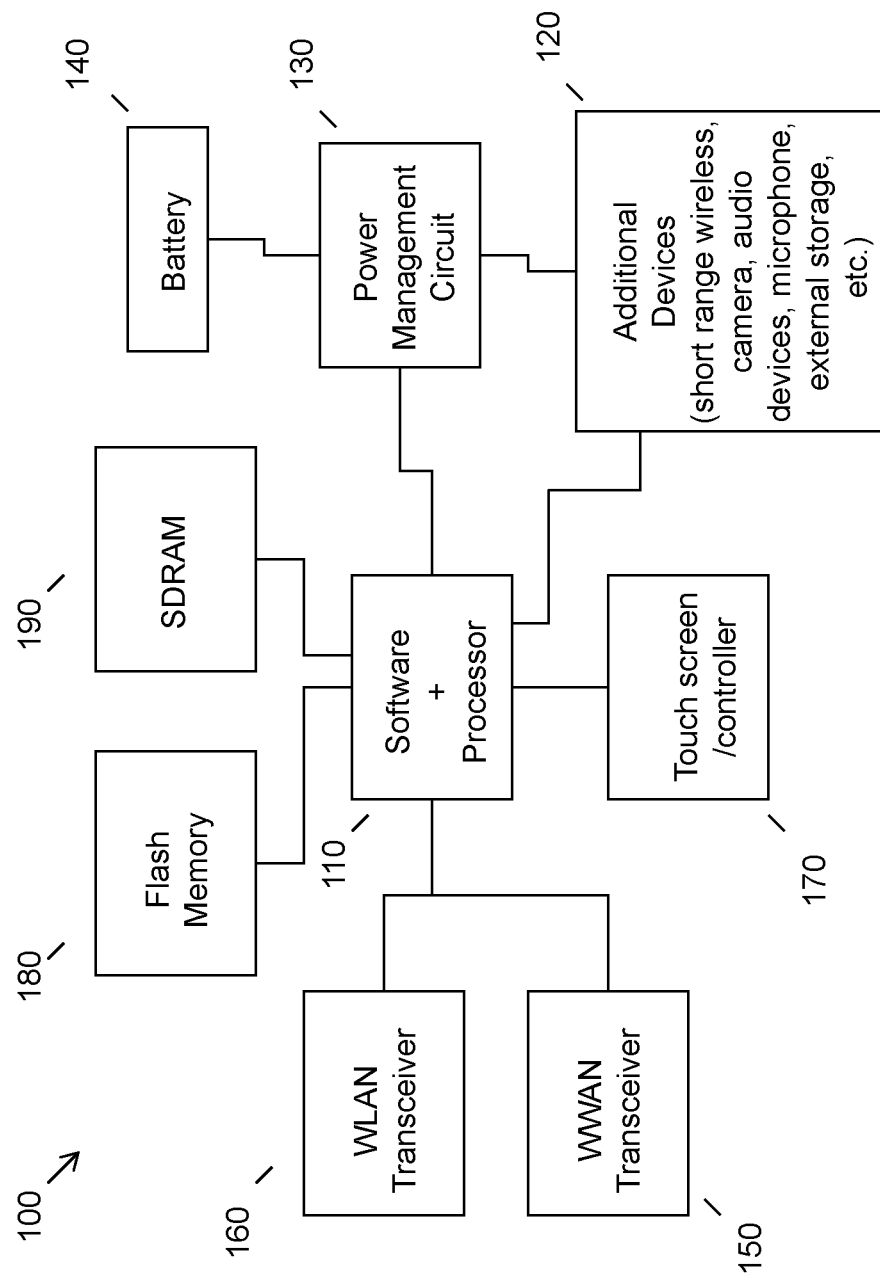
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventionally, digital assistant software employed on devices (e.g., Siri® for Apple®, Cortana® for Windows®, Alexa® for Amazon®, etc.) may identify a vocal command provided by a user (e.g., by comparing to an accessible command bank), associate that command with a corresponding task, and subsequently take actions to complete the task. For example, a user may command a digital assistant to create a shopping list. Upon recognizing the command, the digital assistant may enter into a "conversation mode" where it waits to receive subsequent vocal inputs (e.g., vocal inputs related to items to be placed on the list) and then, upon receipt, stores those inputs at an accessible storage location.

Digital assistants may be helpful to users who desire hands-free voice-control of a device. Common situations where digital assistants may be employed include when a user is driving, when a user is physically pre-occupied with another task, or when a user determines that a vocal command may be a faster and more convenient way of completing a task.

Conventional digital assistants, however, contain several issues pertaining to the receipt and processing of vocal input. One issue, for example, is that a "wakeup word" must be provided to the digital assistant each time before a user wishes to provide a vocal command. The wakeup word indicates to the digital assistant that it is about to receive vocal input that it should process. For example, if the wakeup word was "Assistant," when creating a shopping list a user would need to repeat this word each time they wanted to add a new item to the list (e.g., "Assistant, add milk to the list," "Assistant, add bread to the list," etc.). The required repetition of the wakeup word may become annoying and burdensome to the user. Additionally, if a user forgets to communicate the wakeup word before providing a vocal command, then the digital assistant may not recognize the command as input it should process. For example, when creating a shopping list, if a user just says "add milk," the digital assistant may not recognize that it should add the milk item to the shopping list.

Accordingly, an embodiment provides a method of initiating a contextual input session wherein a digital assistant is capable of receiving and processing vocal context input during the duration of the contextual session. In an embodiment, the digital assistant may receive an indication (e.g., a wakeup action followed by a context command) to initiate a contextual session related to a particular context (e.g., news, email, sports, etc.). The duration of the contextual session may last indefinitely or until an interruption (e.g., an indication to end the current session, an indication to enter a different session, etc.) occurs. During the session, vocal commands associated with the context may be received and processed by the digital assistant. Such a method enables a user to communicate a multitude of commands to the digital assistant without having to repeat a wakeup word or wakeup gesture before each command.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
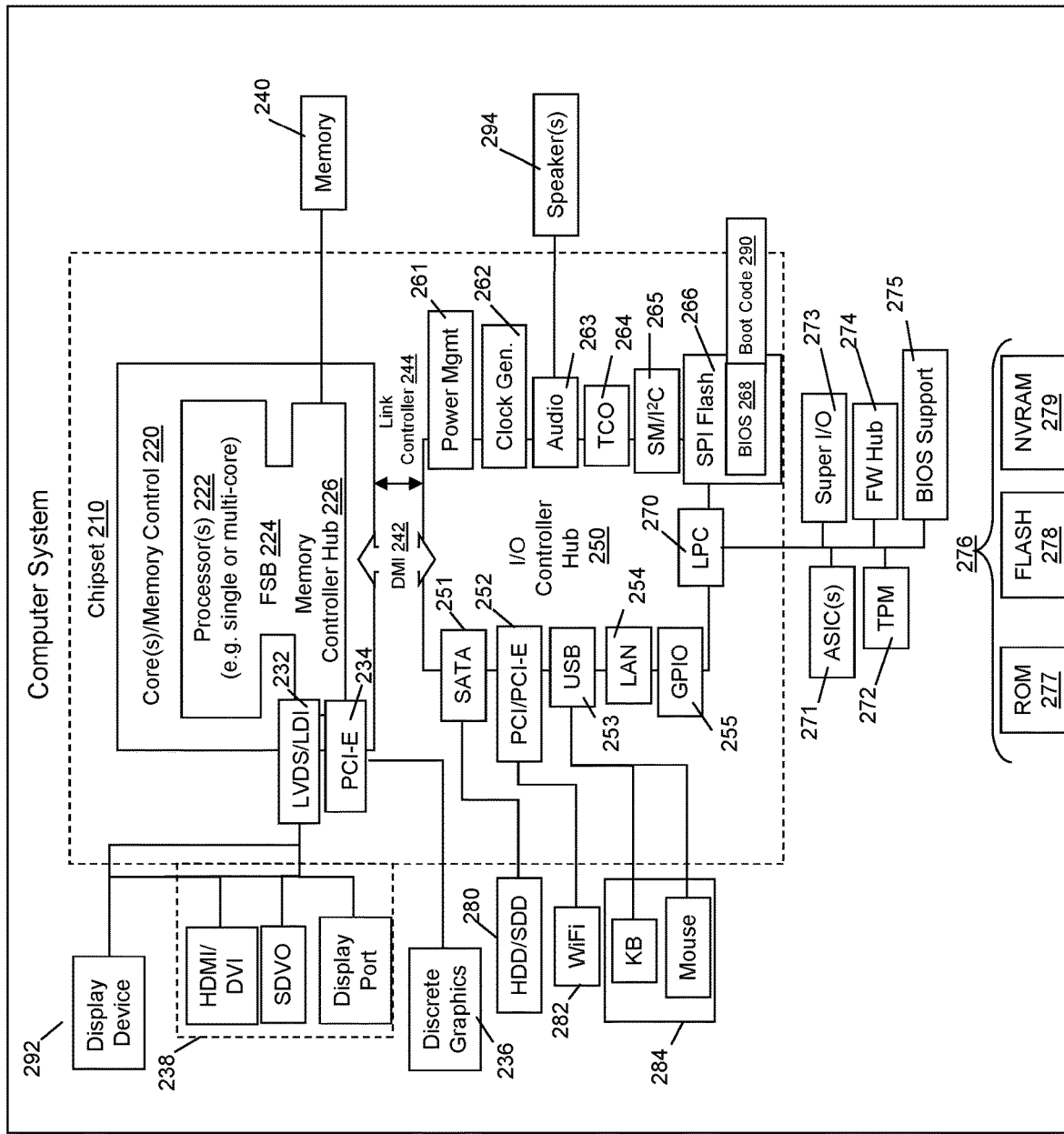
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart speakers, personal computer devices generally, and/or electronic devices which enable users to communicate with a digital assistant. For example, the circuitry outlined in FIG. 1 may be implemented in a tablet or smart phone embodiment, whereas the circuitry outlined in FIG. 2 may be implemented in a personal computer embodiment.

Figure 3:
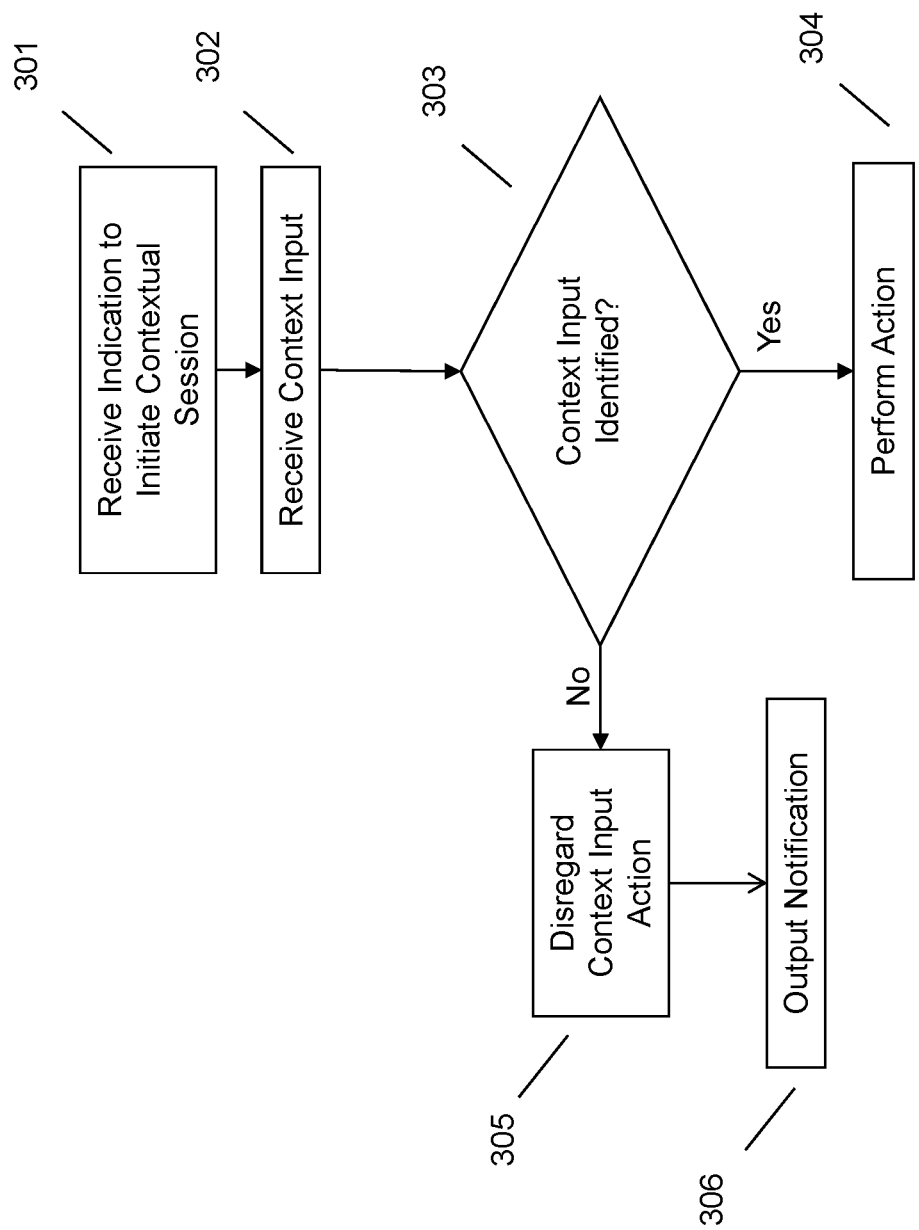
FIG. 3 illustrates an example method of initiating a contextual input session.

Referring now to FIG. 3, an embodiment may initiate a contextual input session during which an embodiment may receive context input and may perform tasks associated with the context input. At 301, an embodiment may receive an indication to initiate a contextual session. The indication, for example, may be a user-communicated wakeup action such as a wakeup word or a wakeup gesture (e.g., a hand wave) followed by a context command. The context command may trigger the digital assistant to initiate a contextual session in which subsequent user inputs may be related to the context, or subject, of the context command. For example, when an embodiment receives a wakeup action followed by the context command, "Read emails," an embodiment may initiate a contextual session related to email browsing.

An embodiment may identify a particular context from a context command by comparing the context command to an accessible storage bank of recognizable contexts. In another embodiment, the context may be determined by an activity a user is presently engaged in. In an embodiment, a digital assistant may be connected to another device (e.g., television, radio, etc.) or synced with another application (e.g., video playing application, music playing application, etc.) and may be able to determine the context from the active application or device. For example, if a user was watching television on a smart TV, the digital assistant may identify that a television viewing session was active and knows to accept context input related to television viewing (e.g., "list sports channels").

At 302, an embodiment may receive context input that is associated with the context of the contextual session. In an embodiment, during the duration of the contextual session, the user does not need to repeat the wakeup action prior to communicating the context input. For example, for a contextual session related to email-browsing, a user may provide email-related commands such as "read this email to me," "archive this email," "delete that message," etc. In another example, for a contextual session related to the creation of a shopping list, a user may vocally list items they wish to add to the list such as "add milk," "add bread," "add cheese," etc. In yet another example, for a contextual session associated with music, a user may vocally list the song or artist they wish to listen to.

In an embodiment, eye-tracking software may be utilized to determine whether a user actually intended on conveying input to the digital assistant. For example, if an embodiment determines (e.g., based on eye-tracking) that a user was looking at the digital assistant, or a particular device a digital assistant was associated with, while transmitting vocal input then the digital assistant may determine that the vocal communication should be perceived as context input.

In an embodiment, context input may be received from multiple users. For example, during a shopping list contextual session, the digital assistant may receive a command to add milk to the list from one user and may receive another command to add bread to the list from a different user. In an embodiment, multiple contextual sessions may be concurrently active, where each contextual session relates to a separate context. For example, during the duration of a contextual session associated with the creation of a shopping list, an embodiment may also receive context input for a contextual session associated with email browsing. Each contextual session may be initiated, for example, by a separate wakeup action associated with the context of the session. In an embodiment, multiple contextual sessions may be concurrently active, where each contextual session may receive context input from a specific user. For example, two users may initiate separate contextual sessions and provide context input to those sessions, wherein the input is differentiated based upon the user's identity. An embodiment may differentiate between the inputs based upon, for example, voice-recognition of the users.

In an embodiment, context input may be received by a digital assistant until an interruption in the contextual session occurs. In an embodiment, the interruption may be a command to end the contextual session. For example, during a shopping list contextual session, a user may provide the vocal command "end shopping list," which provides the digital assistant with the indication to end the session. In another embodiment, the interruption may be a command to begin another contextual session, whereby the initial contextual session is temporarily paused and does not recognize input associated with the initial session while the other session is active. For example, during a shopping list contextual session, a user may initiate an email browsing contextual session, during which context input associated with the shopping list (e.g., add milk, add bread, etc.) are not recognized. In an embodiment, a notification may be provided to the user that the contextual session has ended.

Responsive to identifying the received context input, at 303, an embodiment may perform, at 304, an action associated with the input. In an embodiment, a digital assistant may access instructions that dictate the type of action that should be performed in response to a particular input. For example, in a shopping list contextual session, responsive to receiving the input "add milk" or "milk," an embodiment may add milk to the list of items on the shopping list. In an embodiment, the instructions may be stored locally on the device or may be stored at an accessible remote storage location (e.g., the cloud).

At 305, responsive to not identifying the received context input, an embodiment may disregard the context input. An embodiment may not identify received context input for a variety of reasons. For example, the received input was not associated with the current contextual session (e.g., during a shopping list contextual session, an embodiment may receive a command associated with email browsing). In another example, during the duration of a contextual session, a user may produce unidentifiable vocal output that they did not intend for the digital assistant to process (e.g., a user was speaking to another person). At 306, an embodiment may provide a notification to the user that the received input was not identified. In an embodiment, the notification may be an audible notification, where a device may vocally inform a user that their input was not recognized. In another embodiment, the notification may be a visual notification. For example, a textual message may appear across a device's screen notifying the user that their input was not recognized.

The various embodiments described herein thus represent a technical improvement to conventional communications with a digital assistant. Using the techniques described herein, a user may be able to enter into a contextual "conversation mode" with a digital assistant that makes it easier to converse with the digital assistant. An embodiment initiates a contextual session in which a user may transmit context input to the digital assistant without having to repeat the wakeup action prior to each transmission.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, an indication to initiate a contextual session, wherein the indication is associated with a context command provided by a user, wherein the indication comprises a wakeup action and the context command, wherein the wakeup action comprises at least one of a wakeup word or a wakeup gesture;
   identifying, using a processor, a context associated with the context command;
   receiving, at the information handling device, at least one input from the user during a duration of the contextual session;
   determining, using a processor, whether the at least one input is associated with at least one context input, wherein the at least one context input is associated with the context; and
   extending, responsive to determining that the at least one input is associated with the at least one context input, the duration of the contextual session, wherein the extended duration does not require receipt of subsequent indications.

2. The method of claim 1, wherein the context of the contextual session is determined based on a context of an application associated with the information handling device.

3. The method of claim 1, wherein the duration is continuous until an interruption is detected.

4. The method of claim 3, wherein the interruption is at least one interruption selected from the group consisting of a command to end the contextual session and a command to begin another contextual session.

5. The method of claim 1, wherein the receiving further comprises receiving the at least one context input from multiple users.

6. The method of claim 1, further comprising determining an intention to transmit the at least one context input based upon eye-tracking.

7. The method of claim 1, further comprising responsive to the at least one context input being unidentifiable, providing a notification.

8. The method of claim 1, further comprising performing, using a processor, an action associated with the context input.

9. An information handling device, comprising:
   a processor;
   a memory device that stores instructions executable by the processor to:
   receive an indication to initiate a contextual session, wherein the indication is associated with a context command provided by a user, wherein the indication comprises a wakeup action and the context command, wherein the wakeup action comprises at least one of a wakeup word or a wakeup gesture;
   identify a context associated with the context command;
   receive at least one input from the user during a duration of the contextual session;
   determine whether the at least one input is associated with at least one context input, wherein the at least one context input is associated with the context; and
   extend, responsive to determining that the at least one input is associated with the at least one context input, the duration of the contextual session, wherein the extended duration does not require receipt of subsequent indications.

10. The information handling device of claim 9, wherein the context of the contextual session is determined based on a context of an application associated with the information handling device.

11. The information handling device of claim 9, wherein the duration is continuous until an interruption is detected.

12. The information handling device of claim 11, wherein the interruption is at least one interruption selected from the group consisting of a command to end the contextual session and a command to begin another contextual session.

13. The information handling device of claim 9, wherein the at least one context input is received from multiple users.

14. The information handling device of claim 9, wherein the instructions are executable by the processor to determine an intention to transmit the at least one context input based upon eye-tracking.

15. The information handling device of claim 9, wherein the instructions are executable by the processor to perform an action associated with the context input.

16. A product, comprising:
   a storage device that stores code, the code being executable by a processor and comprising:
   code that receives an indication to initiate a contextual session, wherein the indication is associated with a context command provided by a user, wherein the indication comprises a wakeup action and the context command, wherein the wakeup action comprises at least one of a wakeup word or a wakeup gesture;
   code that identifies a context associated with the context command;
   code that receives at least one input from the user during a duration of the contextual session;
   code that determines whether the at least one input is associated with at least one context input, wherein the at least one context input is associated with the context; and
   code that extends, responsive to determining that the at least one input is associated with the at least one context input, the duration of the contextual session, wherein the extended duration does not require receipt of subsequent indications.

* * * * *